May 17, 1955 I. MOLNAR 2,708,691

ANSWER TIME DELAY REGISTER CIRCUIT

Filed March 10, 1951 2 Sheets-Sheet 1

*INVENTOR.*
IMRE MOLNAR

*BY* Wm Walter Dixon

ATTORNEY

May 17, 1955 I. MOLNAR 2,708,691

ANSWER TIME DELAY REGISTER CIRCUIT

Filed March 10, 1951 2 Sheets-Sheet 2

INVENTOR.
IMRE MOLNAR

BY McWatters Devere

ATTORNEY 2,708,691
Patented May 17, 1955

1

2,708,691

ANSWER TIME DELAY REGISTER CIRCUIT

Imre Molnar, Chicago, Ill., assignor to Automatic Electric Laboratories, Inc., Chicago, Ill., a corporation of Delaware Application March 10, 1951, Serial No. 214,833

10 Claims. (Cl. 179—8.5)

This invention relates in general to time delay register circuits and in particular to such circuits adapted to telephone systems wherein the number of toll calls not answered by the toll operator within a predetermined time will be registered as well as data with which to determine the average time for answering all of the toll calls.

Accordingly, the main object of the invention is to provide a delay register to register the number of toll calls, over any one particular toll trunk, not answered within a predetermined period.

It is another object to provide in such a system a delay register that will cumulatively register the total time elapsed in answering all of the toll calls over any one particular toll trunk.

It is another object to provide in such a system a peg count meter for registering the total number of calls received over any one particular toll trunk.

A feature of this invention resides in the simplicity of connecting the circuit to any one particular toll trunk.

Figure 1:
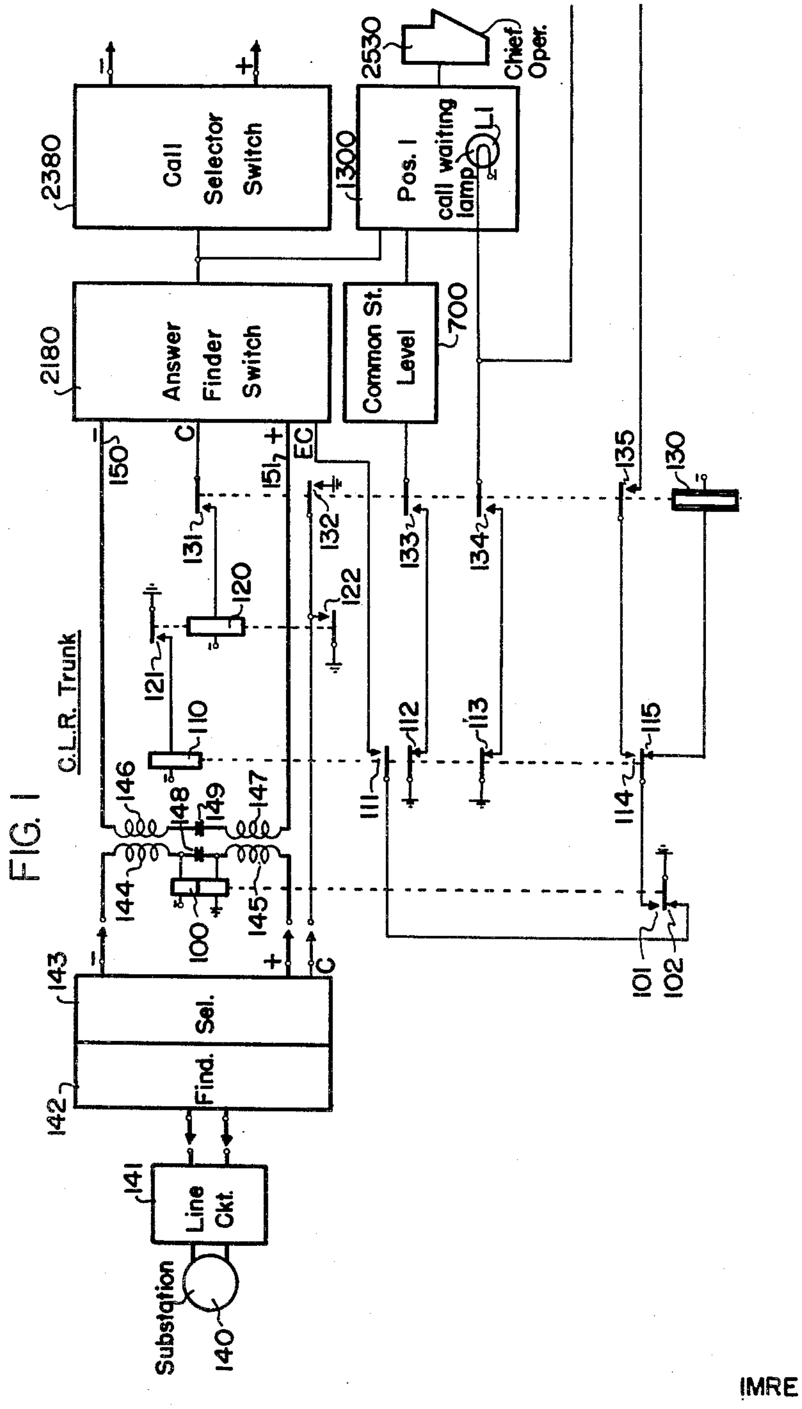
Figure 2:
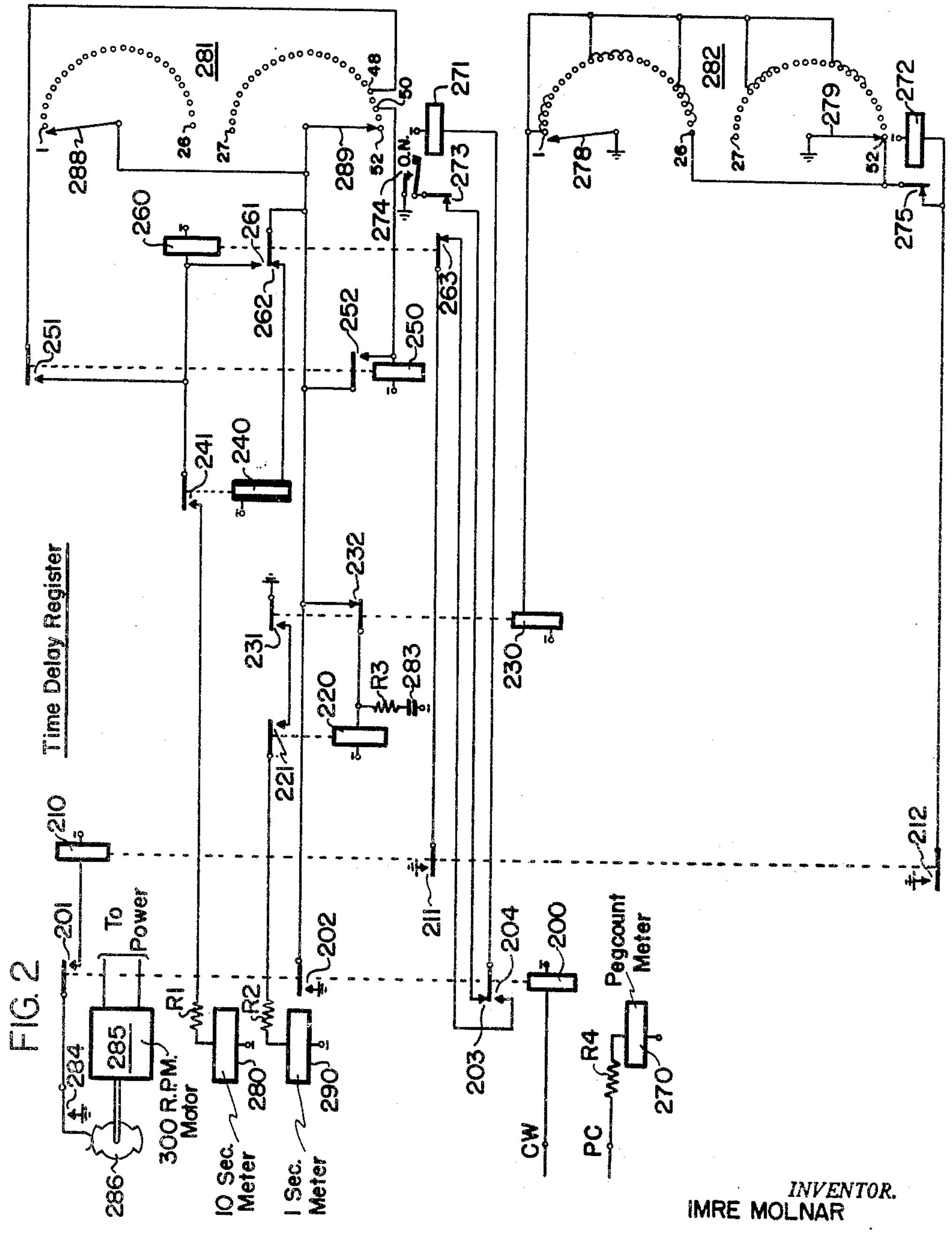

Other objects and features will be evident and a complete understanding of the construction and operation may be had from a perusal of the description in conjunction with the accompanying drawings, in which:

Fig. 1 illustrates a substation linked to a CLR trunk; and Fig. 2 illustrates the time delay register circuit associated with that particular CLR trunk.

Briefly described, the objects hereinbefore set forth are attained by employing a 300 R. P. M. motor for causing a pulsing relay to operate 10 times per second during the waiting time of a call. Two twenty-six point rotary switches, such as disclosed in U. S. Patent 2,522,715, issued to K. W. Graybill and H. Sengebusch, September 19, 1950, are utilized and step by the operation of the pulsing relay. The two contact arms of each rotary switch are displaced 180° from each other so that fifty-two contact terminals will be passed over during one revolution. Rotary switch 281, stepping ten steps per second, causes a 10 second meter 280 to operate after 100 steps, or nearly two complete revolutions—namely after 10 seconds. If the call is answered by the toll operator during this 10 second period, the meter, of course, would not operate and rotary switch 281 would return to normal. The other rotary switch 282 also steps ten steps per second and causes 1 second meter 290 to operate once every 10 steps or one second. This rotary switch also stops its rotation when the call is answered, but does not return to any particular home position. A third meter, peg-count meter 270, operates each time a call is received over the CLR trunk illustrated. Thus, the number of calls delayed more than 10 seconds may be ascertained by the reading on the 10 second meter and the average waiting time may be computed by dividing the total waiting time, indicated by the 1 second meter, by the total number of calls indicated on peg-count meter 270.

Having briefly described my invention, a detailed description thereof follows immediately hereinafter. In order to initiate a toll call the subscriber at substation 140 removes the receiver and dials the appropriate digit individual to the toll trunk. A loop circuit is therefore extended in well-known manner from substation 140 over line circuit 141, finder 142, selector 143, windings 144 and 145 of the repeating coil to relay 100. Relay 100 therefore operates and, in closing contacts 101, causes slow-to-release relay 130 to operate via contacts 115. Relay 130, in operating and in therefore closing contacts 131, prepares a circuit for relay 120; in closing contacts 132, provides a holding ground for the preceding switching equipment; in closing contacts 133, causes common start 700 to prepare answer finder switch 2180; in closing contacts 134, completes a circuit to call waiting lamp L1 and relay 200 via contacts 113; and in closing contacts 135, prepares a circuit for operating peg-count meter 270. At this point it may be mentioned that the CLR trunk is only partially disclosed for obvious simplicity reasons. The toll answering and switching equipment, namely, answer finder switch 2180, call selector switch 2380, common start level 700, and position 1 circuit 1300 are shown in block diagram form as they are disclosed in U. S. Patent 2,361,313, issued to Imre Molnar, October 24, 1944. The numbers assigned to these circuits are similar to those in the above-mentioned patent.

Call waiting lamp L1 illuminates and signals the operator at position 1 that a toll call is awaiting service. Start relay 200 also operates at this time in order to initiate the operation of the time delay register. Start relay 200, in operating and in therefore closing contacts 201, prepares a circuit for pulsing relay 210; in closing contacts 202, completes a circuit for relay 220 via contacts 232, completes a circuit for relay 240 via contacts 262, and provides a holding ground for other relays hereinafter described; and in closing contacts 204, prepares a circuit for motor magnet 271. Relay 220 therefore operates and, in closing contacts 221, prepares a circuit for 1 second meter 290. Relay 240 also operates and, in closing contacts 241, prepares a circuit for 10 second meter 280. The 300 R. P. M. motor 285 rotates continuously and as there are two raised sections on cam 286, contacts 284 close 600 times per minute or 10 times per second. Pulsing relay 210 therefore operates 10 times per second via contacts 201, and at contacts 211 causes motor magnet 271 to operate, over the following path: ground at contacts 211, contacts 263, and 204, through motor magnet 271 to battery. Motor magnet 271, of course, steps the contact arms of rotary switch 281 each time it operates and after 50 steps or 5 seconds, arm 289 comes in contact with the bank terminal marked 50. An energizing circuit will therefore be completed to relay 250 via contacts 202, contact arm 289 and bank terminal 50. Relay 250 therefore operates and, in closing contacts 251, prepares a circuit for relay 260, and in closing contacts 252, locks itself operated from ground at contacts 202. Assuming now that the operator has not yet answered the toll call, motor magnet 271 continues to operate from the intermittent operation of pulsing relay 210 thereby causing the contact arms of rotary switch 281 to continue stepping. After another 50 steps, or after 10 seconds from original starting time, contact arm 289 comes in contact with bank terminal 48 and completes an energizing circuit for relay 260, over the following path: ground at contacts 202, arm 289, bank terminal 48, contacts 251, through relay 260 to battery. Relay 260, in operating and in therefore closing contacts 261, provides a locking circuit for itself from ground at contacts 202; in opening contacts 262 opens the previously traced energizing circuit to slow-releasing relay 240; and in opening contacts 263, opens the operating circuit of motor magnet 271. 10 second meter 280 therefore operates over the following path: ground at contacts 202, contacts 261, 241, resistor R1, through meter 280 to battery. As previously stated, the circuit for relay 240 will be opened but as it is of the slow-to-release type contacts 241 remain closed momentarily in order to facilitate the operation of meter 280. Motor magnet 271 will not operate again as its circuit is open at contacts 263.

In the meantime, rotary switch 282 also steps from the intermittent operation of pulsing relay 210. Each time pulsing relay 210 operates and closes contacts 212, motor magnet 272 operates over an obvious circuit. As can be seen from the drawings, every 10 steps, namely after every second, ground will be connected to relay 230 from arm 278 or 279, causing it to operate. Relay 230 therefore operates once every second and, in closing contacts 231, causes 1 second meter 290 to operate via contacts 221 and resistor R2; and, in opening contacts 232, causes relay 220 to release. Condenser 283 discharges through relay 220 when contacts 232 are opened and therefore momentarily retains contacts 221 closed in order to facilitate the operation of 1 second meter 290. It may be noted that each time contact arm 279 reaches point 52 a self-interrupting circuit for motor-magnet 272, via contacts 275, will be completed in order to step arm 278 to bank contact No. 1. 1 second meter 290 therefore registers every second a call is not answered.

Assuming now that the operator at position 1 answers the toll call and handles same as described in the hereinbefore mentioned patent, U. S. 2,361,313, within 10 seconds; relay 120 operates and, in closing contacts 121, causes relay 110 to operate; and, in closing contacts 122, provides another holding ground for the preceding switching equipment. Relay 110 in opening contacts 113, opens the circuit to call waiting lamp L1 and start relay 200; in closing contacts 114 causes peg-count meter 270 to operate over the following circuit; ground at contacts 101, contacts 114, 135, resistor R4, through meter 270 to battery; and, in opening contacts 115, opens the circuit to relay 130. Relay 130, being of the slow-to-release type, maintains contacts 135 closed momentarily in order to facilitate the operation of peg count meter 270. Thus, it may be seen that meter 270 operates for each toll call answered. Returning now to the release of start relay 200, contacts 201 open and cause the release of pulsing relay 210, contacts 202 open, and contacts 203 close. Any relays that were held operated from ground at contacts 202 would restore. The circuits to motor magnets 271 and 272 will be open at contacts 211 and 212, respectively, causing the rotary switches to cease stepping. The contact arms of rotary switch 282 remain in that position, but the arms of rotary switch 281 return to normal caused by the operation of the homing circuit of motor magnet 271, over the following path: ground at off-normal contacts 274, self-interrupting contacts 273, contacts 203, through motor magnet 271 to battery. Motor magnet 271, of course, operates self-interrupted until the arms return to normal and its circuit is opened at off-normal contacts 274.

Assuming now that the call had been answered after the 10 second period and therefore after meter 280 had registered, the circuit to motor magnet 271 would be opened at contacts 211, but would have no effect as contacts 263 would be already open. However, the closing of contacts 203, causes motor magnet 271 to return home as previously described. Rotary switch 282, of course, had continued stepping throughout the waiting time no matter how long it was. The circuit to motor magnet 272 would now be open at contacts 212, as in the case when the call was answered during the 10 second period, and, thereby causes rotary switch 282 to cease stepping.

It should thus be seen that 10 second meter 280 registers the total number of calls not answered within 10 seconds and 1 second meter 290 registers the total waiting time in seconds for all of the calls. By dividing the total waiting time reading of meter 290 by the total number of calls indicated by peg-count meter 270, the average waiting time for all of the calls may be ascertained. It should likewise be noted that the register circuit is connected very conveniently and simply to the terminals marked CW for call waiting and P. C. for peg-count. This time delay register circuit could be connected to any of the toll trunks in the system in order to obtain the desired information.

While there has been described what is at present considered to be the preferred embodiment of the invention, it will be understood that various modifications may be made therein, and it is intended to cover in the appended claims all such modifications as fall within the true spirit and scope of the invention. It should be understood, for example, that the inventor does not wish to be limited to a 10 second period as any simple switching or strapping arrangement could be embodied in the invention in order to cause the register circuit to operate after various waiting periods.

Having described my invention in detail, what I claim and desire to have protected by issuance of Letters Patent of the United States is:

1. In a time delay register circuit for operation with a single trunk to cumulatively register the number of calls made over the trunk which have not been answered within a predetermined interval of time and to cumulatively register the elapsed time between seizure of the trunk by a call and the answering of the call thereover, a pulsing relay, means for intermittently operating said pulsing relay at a predetermined rate, means operated responsive to the seizure of said trunk for causing said last means to operate said relay, a first stepping switch, a circuit controlled by the operation of said pulsing relay for stepping said first stepping switch at said rate, a first meter operated in response to a predetermined number of stepping operations of said first stepping switch to cumulatively register the number of calls not answered within said time interval, a second stepping switch, another circuit controlled by the operation of said pulsing relay for stepping said second stepping switch at said rate, and a second meter operated in response to every successive predetermined number of stepping operations of said second stepping switch to cumulatively register the elapsed time between seizure of the trunk by a call and the answering of the call thereover.

2. In a time delay register circuit operatively connected to a particular trunk, a meter for registering the number of telephone connections over the trunk not answered within a predetermined period, a start relay, means for operating said start relay, means operated responsive to the seizure of the trunk for operating said last means, a pulsing relay, an intermittently operated pulsing circuit, means operated in response to the operation of said start relay for connecting said pulsing circuit to said pulsing relay, whereby said pulsing relay intermittently operates at a predetermined rate, a stepping device, means for stepping said stepping device, means operated in response to each operation of said pulsing relay for operating said last means for stepping said stepping device, and means including contacts on said stepping device operated in response to a predetermined number of stepping operations of said stepping device for operating said meter.

3. In a time delay register circuit operatively connected to a trunk, a meter for registering the number of telephone connections over the trunk not answered within a predetermined period, a start relay, means for operating said start relay, means operated responsive to the seizure of the trunk for operating said last means, a pulsing relay, an intermittently operated pulsing circuit, means for connecting said pulsing circuit to said pulsing relay, means whereby said last means is operated responsive to the operation of said start relay whereby said pulsing relay intermittently operates at a predetermined rate, a stepping device, stepping means, means whereby said last means is operated in response to each operation of said pulsing relay for stepping said stepping device, a first relay, means including contacts on said stepping device operated in response to a predetermined number of stepping operations of said stepping device for operating said first relay, a second relay, means including contacts on said stepping device and said first relay operated in response to a further predetermined number of stepping operations of said stepping device for operating said second relay, and means operated in response to the operation of said second relay for operating said meter, said stepping means rendered inoperative in response to the operation of said second relay to thereby terminate the stepping operation of said stepping device.

4. In a time delay register circuit as claimed in claim 3, an additional stepping device, an additional stepping means for stepping said additional stepping device, means whereby said last stepping means is operated in response to each operation of said pulsing relay, an additional meter, means for intermittently operating said additional meter, and means operated after every predetermined number of stepping operations of said additional stepping device for operating said last means.

5. In a time delay register circuit as claimed in claim 3, including means for restoring said start relay, means whereby said last means is operated responsive to the answering of the telephone connection, homing means, means whereby said homing means is operated in response to the restoration of said start relay for causing said stepping device to return to normal, and means for preventing the operation of said meter if the telephone connection is answered before said meter has operated, and means operated in response to the restoration of said start relay for operating said last means said homing means being operated when the connection is answered before as well as after the operation of said meter.

6. In a time delay register circuit as claimed in claim 5, a peg-count meter, means for operating said peg-count meter, and means operated in response to the answering of the telephone connection for operating said last means.

7. In a time delay register circuit for operation with a trunk, a start relay, a circuit for operating said start relay, means for completing said circuit, means whereby said last means is operated in response to the extension of a calling connection to said trunk, a pulsing relay, an intermittently operated pulsing circuit, contacts operated in response to the operation of said start relay for connecting said pulsing circuit to said pulsing relay, whereby said pulsing relay intermittently operates at a predetermined rate, a first stepping switch, a first stepping circuit including contacts on said start relay, means for completing said circuit, means whereby said last means is operated in response to each operation of said pulsing relay for stepping said first stepping switch, a first relay, a circuit including contacts on said first stepping switch and said start relay for operating said first relay, means for completing said last circuit, means whereby said last means is operated in response to a predetermined number of stepping operations of said first stepping switch for operating said first relay, a second relay, a circuit for said second relay including contacts on said first stepping switch and said first relay, means for completing said last circuit, means whereby said last means is operated in response to a predetermined further number of stepping operations of said first stepping switch for operating said second relay, a first meter, a circuit including contacts on said second relay and said start relay for operating said meter, means for completing said circuit, means whereby said last means is operated in response to the operation of said second relay for operating said first meter, said first stepping circuit rendered inoperative in response to the operation of said second relay for terminating the stepping operation of said first stepping switch, a second stepping switch, a second stepping circuit means for controlling said last circuit means whereby said last means is also operated in response to each operation of said pulsing relay for stepping said second stepping switch, a third relay, a circuit for said third relay including contacts on said second stepping switch, means for controlling said last circuit, means whereby said last means is intermittently operated in response to every predetermined number of stepping operations of said second stepping switch, a second meter, a circuit including contacts on said third relay, means for controlling said last circuit, means whereby said last means is operated in response to each operation of said third relay for intermittently operating said second meter, said start relay restoring in response to the answering of the telephone connection, a homing circuit including contacts on said start relay, means whereby said last contacts are operated in response to the restoration of said start relay for causing said first stepping switch to return to normal, said first meter operating circuit rendered inoperative in response to the restoration of said start relay for preventing the operation of said first meter if the telephone connection is answered before said first meter has operated, said homing circuit operating when the connection is answered before as well as after the operation of said meter, said second meter operating circuit rendered inoperative in response to the restoration of said start relay for preventing any further operation of said second meter, a peg-count meter, a circuit for operating said peg count meter, means for completing said last circuit, and means whereby said last means is operated in response to the answering of the telephone connection.

8. A registering device for use with a circuit to which calls are extended and answered, comprising two meters, a timing device operating at a predetermined rate, means for connecting said timing device to one of said meters, means whereby said last means is operated upon the receipt of a call for causing said device to operate said one of said meters once for each predetermined number of operations of the device, means for operating another of said meters, means whereby said last means is operated once for each of a different number of operations of the device, means for preventing further operation of said meters, means whereby said last means is operated upon answering the call, one meter registering total elapsed time of all calls and the other registering the number of calls not answered within a predetermined time.

9. In a time delay register for operation with a single trunk, a circuit, means operated upon seizure of said trunk when a call is made thereto for closing said circuit, means operated upon answering of a call to the trunk for opening said circuit, a meter for registering elapsed time after the closing of said circuit, a pulsing relay, means for intermittently operating said pulsing relay at a predetermined rate, means operated in response to the closing of said circuit for causing said operating means to operate said relay at said rate, a stepping switch, a circuit for operating said switch, means controlled by the operation of said pulsing relay for completing said last circuit to thereby step said switch at said rate, a circuit for operating said meter, means for completing said last circuit, and means controlled by a predetermined number of stepping operations of said switch for operating said last means to complete said meter circuit to thereby operate said meter.

10. In a time delay register for measuring the elapsed time between successive closing and opening switching operations occurring in a circuit, a relay, means for operating said relay, means whereby said last means is operated responsive to the closure of said circuit for operating said last means to operate said relay, a first meter, means for operating said meter, means whereby said last means is operated in response to one predetermined period of operation of said relay for registering a predetermined elapsed time, a second meter, means for operating said second meter, means whereby said last means is intermittently operated at different predetermined periods during the operation of said relay for operating said second meter, a second relay, means for operating said second relay, means whereby said last means is operated responsive to the opening of said circuit for operating said first relay, means controlled by the operation of said second relay for restoring said first relay, means operated in response to the restoration of said first relay to thereby render said first and second meters inoperative, a third meter, means for operating said third meter, means whereby said last means is operated in response to the operation of said second relay for operating said third metering means.

References Cited in the file of this patent

UNITED STATES PATENTS

| | | |
|---|---|---|
| 1,676,742 | Ostline | July 10, 1928 |
| 1,823,944 | Kittredge | Sept. 22, 1931 |
| 2,194,072 | Humphries | Mar. 19, 1940 |
| 2,393,403 | Ostline | Jan. 22, 1946 |